United States Patent
Ughreja

(10) Patent No.: US 8,843,661 B2
(45) Date of Patent: Sep. 23, 2014

(54) DATA TRANSFER BETWEEN WIRELESS UNIVERSAL SERIAL BUS (USB) HOST CONTROLLER DRIVER AND WIRELESS USB HOST CONTROLLER IN A WIRELESS USB HOST

(75) Inventor: Rakesh Avichal Ughreja, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 12/200,753

(22) Filed: Aug. 28, 2008

(65) Prior Publication Data

US 2010/0058019 A1    Mar. 4, 2010

(51) Int. Cl.
*G06F 3/00* (2006.01)
*G06F 5/00* (2006.01)
*G06F 13/10* (2006.01)

(52) U.S. Cl.
CPC ..................... *G06F 13/102* (2013.01)
USPC ..................... 710/3; 710/33; 710/36

(58) Field of Classification Search
USPC .................................. 710/3, 33, 36
See application file for complete search history.

(56) References Cited

U.S. PATENT DOCUMENTS

| | | | |
|---|---|---|---|
| 7,447,869 B2 * | 11/2008 | Kruger et al. | 711/205 |
| 2006/0123181 A1 * | 6/2006 | Aull et al. | 710/310 |
| 2007/0083695 A1 * | 4/2007 | Aull et al. | 710/310 |
| 2007/0237179 A1 * | 10/2007 | Sethi | 370/469 |
| 2008/0183920 A1 * | 7/2008 | Jiang et al. | 710/53 |
| 2008/0288718 A1 * | 11/2008 | Hepkin et al. | 711/104 |
| 2009/0089459 A1 * | 4/2009 | Jeyaseelan et al. | 710/7 |

* cited by examiner

*Primary Examiner* — Zachary K Huson
(74) *Attorney, Agent, or Firm* — Kacvinsky Daisak Bluni PLLC

(57) ABSTRACT

A wireless Universal Serial Bus (USB) host that optimizes the data transfer between the Wireless Host Controller Driver (WHCD) and the Wireless Host Controller (WHC). The data transfer between the WHCD and the WHC is optimized by reducing the overhead of data fragmentation. Higher performance without sacrificing memory and computation power is achieved with the optimization of the data transfer.

17 Claims, 4 Drawing Sheets

400

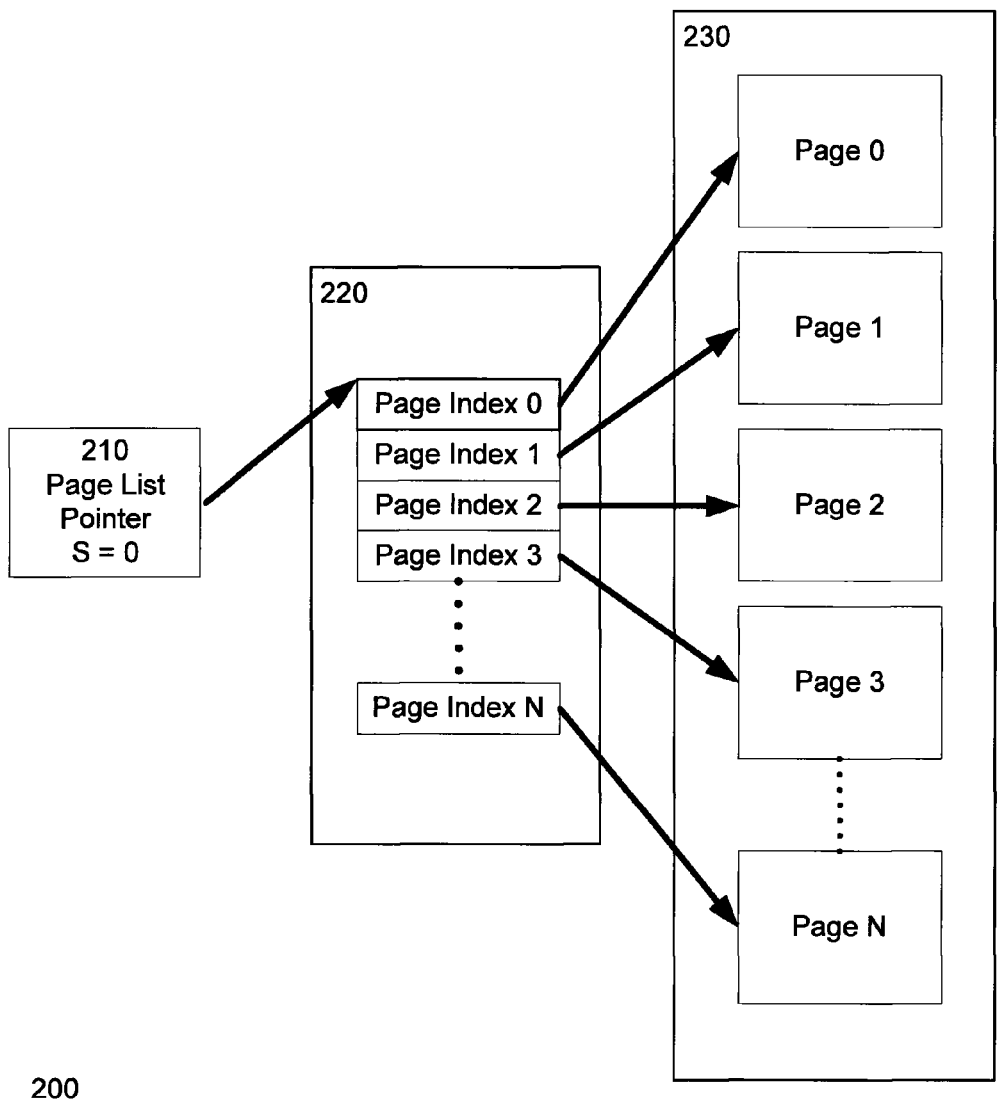
(PRIOR ART)
FIG. 1
(PRIOR ART)
FIG. 2

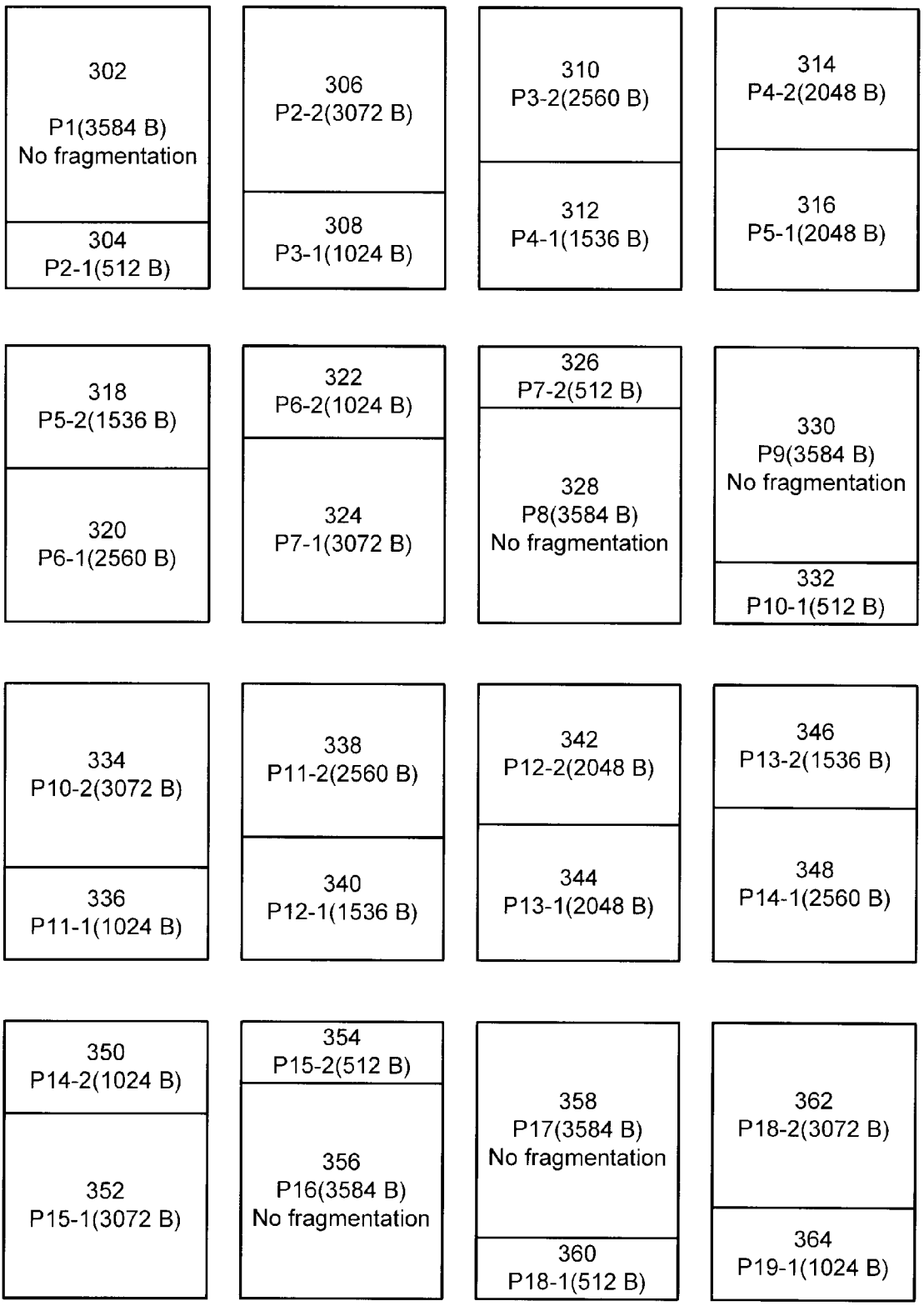
(PRIOR ART)
FIG. 3

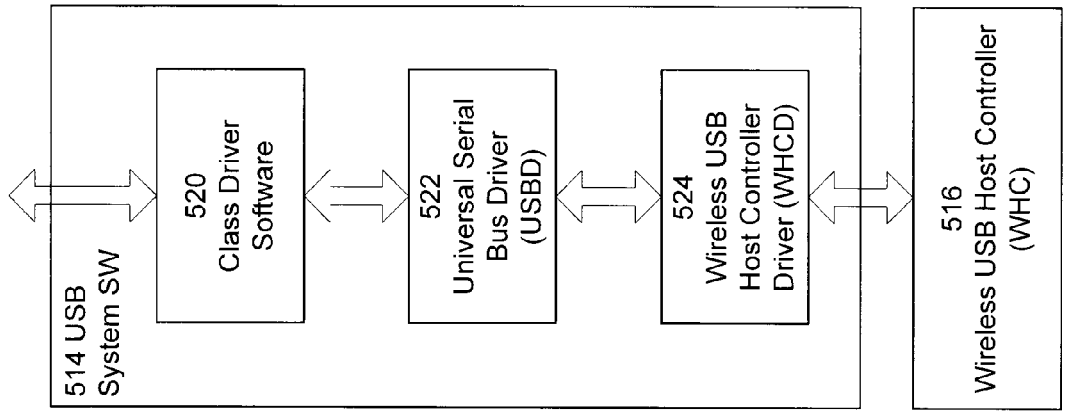
FIG. 5
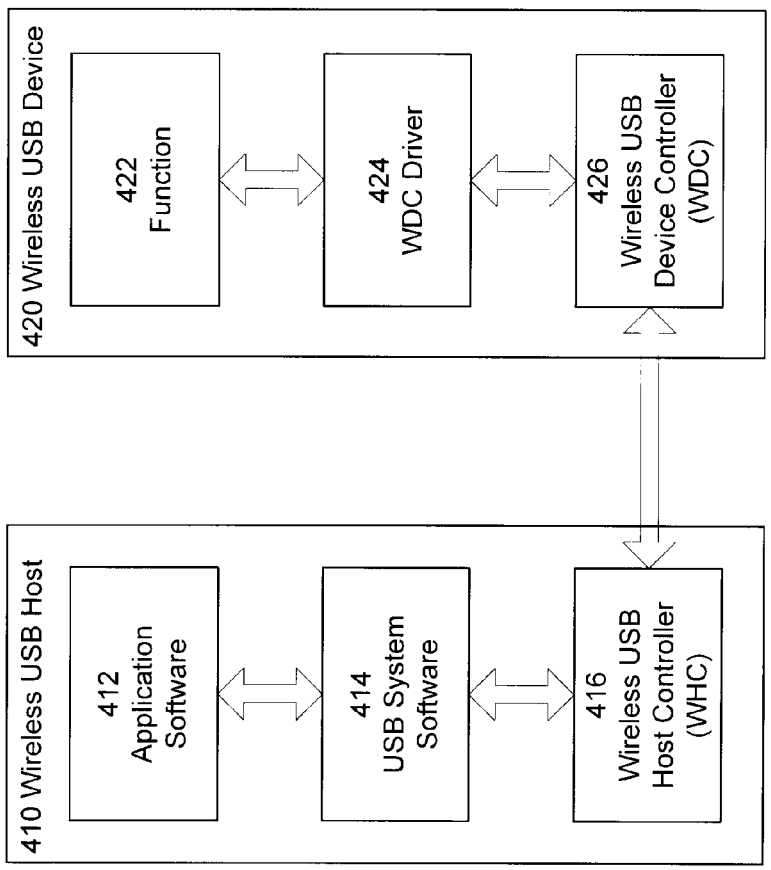
FIG. 4

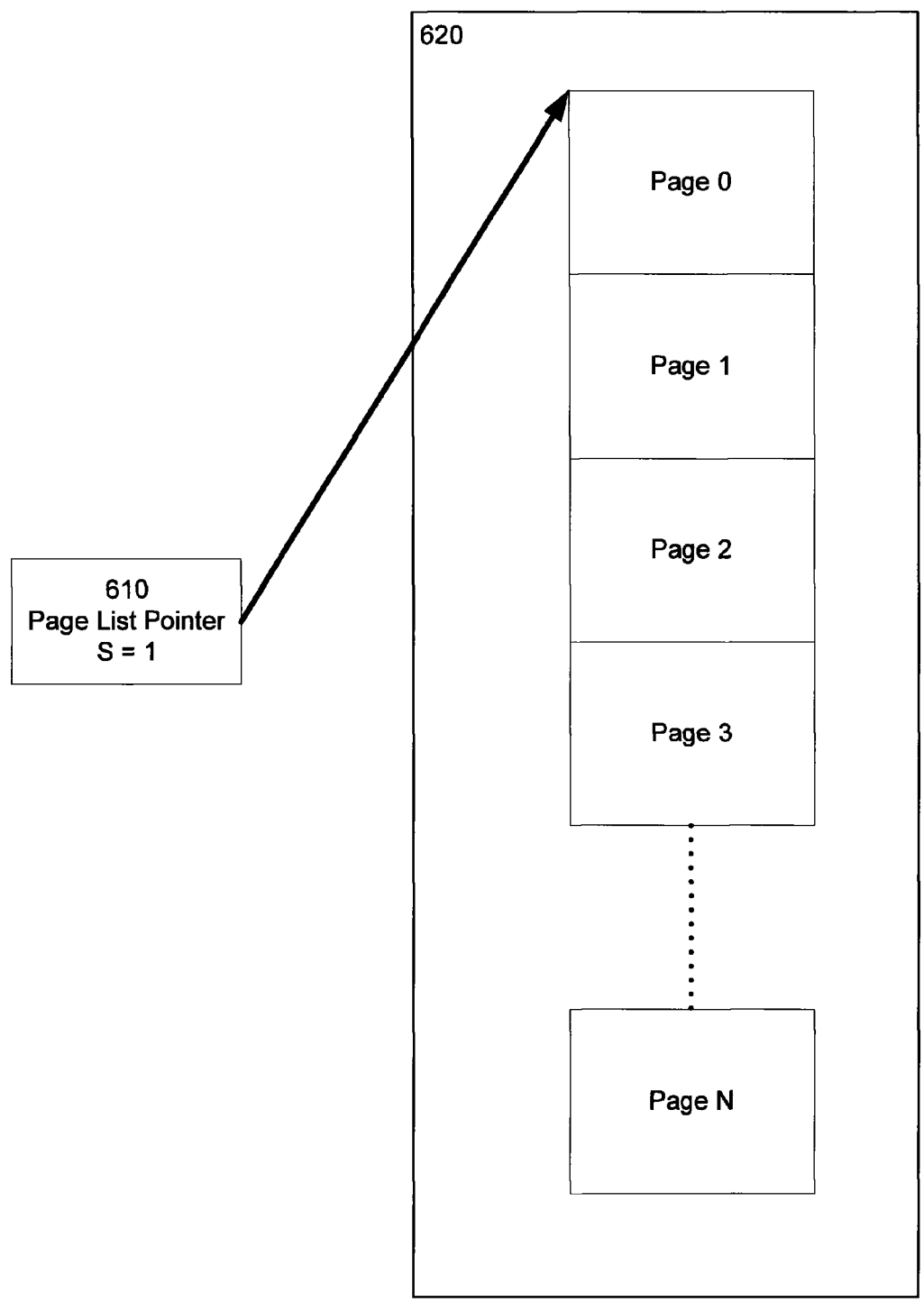
FIG. 6

DATA TRANSFER BETWEEN WIRELESS UNIVERSAL SERIAL BUS (USB) HOST CONTROLLER DRIVER AND WIRELESS USB HOST CONTROLLER IN A WIRELESS USB HOST

FIELD OF THE INVENTION

This invention relates to a wireless universal serial bus host, and more specifically but not exclusively, to optimizing the data transfer between a wireless universal serial bus host controller driver and a wireless universal serial bus host controller in a wireless universal serial bus host.

BACKGROUND DESCRIPTION

The data transfer information between the Wireless Universal Serial Bus (USB) Host Controller Driver (WHCD) and the Wireless USB Host Controller (WHC) in a wireless USB host is specified in a Queue Element Transfer Descriptor (qTD) data structure 100 as shown in FIG. 1. The Small transfer bit (S) indicates that the page list pointer contains the physical memory address of a physical page of a data buffer or the physical memory address pointer of a page list in the qTD data structure 100. When WHCD sets S to 1, it writes the physical memory address of the physical page of the data buffer in a page list pointer of the qTD data structure 100 and when WHCD sets S to 0, it writes the physical memory address pointer of the page list in the page list pointer.

FIG. 2 illustrates the typical memory arrangement 200 of the page list and the pages when S is set to 0. Element 210 shows the page list pointer that points to the start address of a page list 220. The page list is an array that contains the physical memory address pointers to the individual pages of a data buffer 230. FIG. 3 illustrates the typical memory arrangement of the pages 300 when WHC is transferring 64 kilobytes of data to the WHCD. The first and last pages are assumed to be aligned to 4096 bytes and each packet size is assumed to be 3584 bytes.

As the maximum size of a page is 4096 bytes, 16 pages are required to transfer the 64 kilobytes of data. Whenever the WHC receives 3584 bytes of data from a wireless USB device, it writes the data into the host memory of the wireless USB host. As the packet size is not aligned to the page size of 4096 bytes of data, fragmentation of the packets is required for the data transfer. For example, the first page is a concatenation of a first data packet P1 302 of 3584 bytes and a first fragment of a second data packet P2-1 304 of 512 bytes. The first data packet P1 302 is not fragmented as its size of 3584 bytes of data can be stored entirely within the first page. The second data packet P2 of 3584 bytes of data is fragmented into two fragments, namely, P2-1 304 of 512 bytes of data and P2-2 306 of 3072 bytes to fit the 4096 bytes limitation of the first page. The explanation of the fragmentation of the other packets to fit into the other pages is not described herein as it is apparent to one of ordinary skill in the relevant art.

When the WHCD is exchanging data with the WHC with S bit set to 0, the WHC is required to fetch the page list and initiate the data transfers into the individual pages. The additional overhead of the WHC to fetch the page list and initiate the data transfers into the individual pages slows down the data transfer between the WHCD and WHC.

BRIEF DESCRIPTION OF THE DRAWINGS

The features and advantages of embodiments of the invention will become apparent from the following detailed description of the subject matter in which:

FIG. 1 illustrates a Queue Element Transfer Descriptor (qTD) data structure 100 (prior art);

FIG. 2 illustrates the typical memory arrangement of the page list and the pages when S is set to 0 (prior art);

FIG. 3 illustrates a typical memory arrangement of the pages when WHC is transferring 64 kilobytes of data to the WHCD (prior art);

FIG. 4 illustrates the block diagram of a system with a wireless USB host and a wireless USB device in accordance with one embodiment of the invention;

FIG. 5 illustrates the components of the USB system software 500 in accordance with one embodiment of the invention.

FIG. 6 illustrates the operation of the page list pointer and the memory pages in accordance with one embodiment of the invention.

DETAILED DESCRIPTION

Reference in the specification to "one embodiment" or "an embodiment" of the invention means that a particular feature, structure or characteristic described in connection with the embodiment is included in at least one embodiment of the invention. Thus, the appearances of the phrase "in one embodiment" appearing in various places throughout the specification are not necessarily all referring to the same embodiment.

Embodiments of the invention optimize the data transfer between the WHCD and the WHC in a wireless USB host. In one embodiment of the invention, the data transfer between the WHCD and the WHC is optimized by reducing the overhead of data fragmentation.

FIG. 4 illustrates the block diagram of a system 400 with a wireless USB host 410 and a wireless USB device 420. Wireless USB host 410 has three modules, namely, the application software 412, the USB system software 414 and the WHC 416. The first module, application software 412, includes, but is not limited, any software communicating with the wireless USB host. The second module, USB system software 414, optimizes the data transfer between the WHCD and the WHC. Further details of the USB system software 414 is illustrated in FIG. 5. The third module, WHC 416, is also optimized to communicate with the USB system software 414 and it enables the communication between the wireless USB host 410 and the wireless USB device 420.

The wireless USB host 410 includes, but is not limited to, a Personal Computer (PC), Personal Digital Assistants (PDAs), cellular phones, a host device wire adapter that provides a connection point for a wireless USB device(s), or any apparatus that provides host controller functions necessary to support wireless USB devices. The wireless USB host 410 is connected to a wireless USB device 420 via a wireless communication protocol. The wireless communication protocol includes but is not limited to, Ultra Wide Band (UWB), or any other wireless communication protocol supported by the wireless USB specification ("Wireless Universal Serial Bus Specification", Rev 1.0, May 2005). The wireless USB device 420 includes, but is not limited to, any function that provides capabilities to the wireless USB host 410 such as a printer, a digital camera, a speaker, etc, or to a device wire adapter that provides a connection point for wired USB devices.

The wireless USB device 420 has three modules, namely, the function module 422, the Wireless Device Controller (WDC) driver 424 and the WDC 426. The function module 422 provides the capabilities such as a printer, a digital camera, a speaker, etc. The function module 422 may also provides a connection point for wired USB devices. The WDC driver 424 enables the communication between the function module 422 and the WDC 426. The WDC 426 enables the communication between the wireless USB device 420 and the wireless USB host 410.

The wireless USB host 410 and wireless USB device 420 may include other components that are not shown in FIG. 4. Some components of the wireless USB host 410 and wireless USB device 420 may be implemented in hardware, firmware or software or combination thereof. FIG. 5 illustrates the components of the USB system software 500. The USB system software 500 has three components, namely, the class driver software 520, the USB Driver (USBD) 522, and the WHCD 524. The class driver software 520 communicates with the application software 412. The class driver software 520 executes on the wireless USB host 410 and it follows the device class type of the wireless USB device 420. The USBD 522 enables the communication between the class driver software 520 and WHCD 524 and abstracts the details of the host controller driver for any particular operating system.

The WHCD 524 enables the communication with the WHC 516. In one embodiment of the invention, the WHCD determines that the allocated memory pages used to exchange data with the WHC 516 are physically contiguous in memory. If all the allocated memory pages are physically contiguous in memory, the WHCD 524 does not form the page list 220 as described earlier. The WHCD 524 avoids the overhead of forming the page list 220 and the WHC 516 exchanges data contiguously with the WHCD 524 via the allocated memory pages. The WHC 516 does not need to fragment data packets when stored in different pages before exchanging data contiguously with the WHCD 524. The removal of the need to fragment the data packets optimizes the communication between the WHCD 524 and the WHC 516.

FIG. 6 illustrates the operation of page list pointer and the memory pages according to one embodiment of the invention. When WHCD 524 determines that the allocated memory pages used to exchange data with the WHC 516 are physically contiguous in memory, WHCD 524 sets an indicator based on the determination and the indicator is accessible by the WHC 516. In one embodiment of the invention, the indicator is the Small transfer bit (S) of the qTD and S is set to one when WHCD 524 determines that the allocated memory pages are physically contiguous in memory. In another embodiment, the indicator includes, but is not limited to, a register bit, an interrupt, or any form of signal to the WHC 516 that the allocated memory pages are physically contiguous in memory. The WHCD 524 provides a start address of a first page of the allocated memory pages to the WHC 516. In one embodiment, the WHCD 524 provides the start address by writing the start address in the page list pointer of the qTD. The page list pointer 610 points to the start address of page 0 of element 620 in FIG. 6. Element 620 illustrates that the allocated memory pages are contiguous in physical memory.

In one embodiment of the invention, the WHC 516 accesses the start address of the allocated memory pages to exchange the data contiguously when the indicator is set. The WHC 516 avoids the overhead of fragmenting data packets when stored in different pages before exchanging data with the WHCD 524 and the WHC 516 exchanges data contiguously with the WHCD 524 via the allocated memory pages. Higher performance without sacrificing memory and computation power is achieved with the optimization of the data transfer between the WHCD 524 and the WHC 516 in the wireless USB host 410.

The embodiments of the invention are not limited to the memory page size and applies to data packets less than or more than the memory page size of 4096 bytes. The fragmentation described in FIG. 3 earlier is not required when the data exchange between the WHCD 524 and the WHC 516 is optimized in accordance with the embodiments of the invention.

In another embodiment of the invention, the WHCD 524 determines that allocated memory pages are physically contiguous in memory by determining that all of the allocated memory pages except the first allocated memory page have a start physical memory address that matches an end physical memory address of a prior memory page. For example, the WHCD 524 determines that the start physical memory address of memory page 1 matches the end physical memory address of the prior memory page of memory page 1, which is memory page 0. Similarly, WHCD 524 determines that the start physical memory address of memory page 2 matches the end physical memory address of the prior memory page of memory page 2, which is memory page 1. The WHCD 524 continues to check the remaining memory pages and if the determination is positive, it determines that the allocated memory pages are physically contiguous in memory.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A wireless Universal Serial Bus (USB) host comprising:
   a Wireless USB Host Controller Driver (WHCD) to:
      determine that a plurality of allocated memory pages is physically contiguous in memory; and
      set an indicator based only on the determination that the plurality of allocated memory pages is physically contiguous in memory; and
   a Wireless USB Host Controller (WHC), communicatively coupled with the WHCD, to exchange data contiguously via the plurality of allocated memory pages in response to a setting of the indicator.

2. The wireless USB host of claim 1, wherein the WHCD is further to provide a start address of a first page of the plurality of allocated memory pages.

3. The wireless USB host of claim 2, wherein the WHC is further to access the start address to exchange the data contiguously.

4. The wireless USB host of claim 1, wherein the indicator is a Small transfer bit (S) of a queue element Transfer Descriptor (qTD).

5. The WHCD of claim 2, wherein providing the start address comprises writing the start address in a page list pointer of a queue element Transfer Descriptor (qTD).

6. The wireless USB host of claim 1, wherein the WHCD to determine that the plurality of allocated memory pages is physically contiguous in memory is to:
   determine that all of the plurality of allocated memory pages except the first allocated memory page has a start physical memory address that matches an end physical memory address of a prior memory page.

7. A system comprising:
   a wireless Universal Serial Bus (USB) host, wherein the wireless USB host comprises:
      a Wireless USB Host Controller Driver (WHCD) to:
         determine that a plurality of allocated memory pages is physically contiguous in memory; and
         set an indicator based only on the determination that the plurality of allocated memory pages is physically contiguous in memory; and
      a Wireless USB Host Controller (WHC), communicatively coupled with the WHCD, to exchange data contiguously via the plurality of allocated memory pages in response to a setting of the indicator; and
   a wireless USB device to communicate with the wireless USB host.

8. The system of claim 7, wherein the WHCD of the wireless USB host is further to provide a start address of a first page of the plurality of allocated memory pages.

9. The system of claim 8, wherein the WHC of the wireless USB host is further to access the start address to exchange the data contiguously.

10. The system of claim 7, wherein the indicator is a Small transfer bit (S) of a queue element Transfer Descriptor (qTD).

11. The system of claim 8, wherein the WHCD of the wireless USB host to provide the start address of the first page of the plurality of allocated memory pages is to write the start address in a page list pointer of a queue element Transfer Descriptor (qTD).

12. The system of claim 7, wherein the WHCD to determine that the plurality of allocated memory pages is physically contiguous in memory is to:
   determine that all of the plurality of allocated memory pages except the first allocated memory page has a start physical memory address that matches an end physical memory address of a prior memory page.

13. A method of data transfer in a wireless Universal Serial Bus (USB) host comprising:
   determining that a plurality of allocated memory pages is physically contiguous in memory;
   setting an indicator based only on the determination that the plurality of allocated memory pages is physically contiguous in memory; and
   exchanging data contiguously via the plurality of allocated memory pages in response to a setting of the indicator.

14. The method of claim 13 further comprising providing a start address of a first page of the plurality of allocated memory pages.

15. The method of claim 14 further comprising accessing the start address to exchange the data contiguously.

16. The method of claim 14, wherein providing the start address comprises writing the start address in a page list pointer of a queue element Transfer Descriptor (qTD).

17. The method of claim 13, wherein determining that the plurality of allocated memory pages is physically contiguous in memory comprises:
   determining that all of the plurality of allocated memory pages except the first allocated memory page has a start physical memory address that matches an end physical memory address of a prior memory page.

\* \* \* \* \*